(12) United States Patent
Wojciak et al.

(10) Patent No.: US 6,867,241 B2
(45) Date of Patent: Mar. 15, 2005

(54) RADIATION-CURABLE, CYANOACRYLATE-CONTAINING COMPOSITIONS

(75) Inventors: Stan Wojciak, New Britain, CT (US); Shabbir Attarwala, Simsbury, CT (US); John T. O'Connor, Wallingford, CT (US); S. Peter Pappas, Juno Beach, FL (US)

(73) Assignee: Henkel Corporation, Rocky Hill, CT (US)

( * ) Notice: Subject to any disclaimer, the term of this patent is extended or adjusted under 35 U.S.C. 154(b) by 123 days.

(21) Appl. No.: 10/059,434

(22) Filed: Jan. 31, 2002

(65) Prior Publication Data

US 2003/0162857 A1 Aug. 28, 2003

(51) Int. Cl.$^7$ .............................. C08F 4/70; C08F 4/80; C09J 4/04
(52) U.S. Cl. ............................ 522/12; 522/14; 522/17; 522/18; 522/20; 522/21; 522/29; 522/173; 526/170; 526/171; 526/172; 526/310
(58) Field of Search ............................. 522/12, 14, 17, 522/18, 20, 21, 29, 173, 182, 28; 526/170, 171, 172, 310, 328, 92, 93

(56) References Cited

U.S. PATENT DOCUMENTS

| | | | |
|---|---|---|---|
| 3,855,040 A | 12/1974 | Malofsky | 156/310 |
| 4,102,945 A | 7/1978 | Gleave | 260/879 |
| 4,105,715 A | 8/1978 | Gleave | 260/881 |
| 4,440,910 A | 4/1984 | O'Connor | 525/295 |
| 4,450,265 A | 5/1984 | Harris | 526/298 |
| 4,525,232 A | 6/1985 | Rooney et al. | 156/273.3 |
| 4,533,446 A | 8/1985 | Conway et al. | 204/159.24 |
| 4,690,957 A | 9/1987 | Fujioka et al. | 522/31 |
| 4,707,432 A | 11/1987 | Gatechair et al. | 430/281 |
| RE32,889 E | 3/1989 | Litke | 523/212 |
| 5,525,698 A | 6/1996 | Böttcher et al. | 528/92 |
| 5,652,280 A | 7/1997 | Kutal | 522/66 |
| 5,691,113 A | 11/1997 | Kutal | 430/274.1 |
| 5,824,180 A | 10/1998 | Mikuni et al. | 156/275.3 |
| 5,877,230 A | 3/1999 | Kutal | 522/66 |
| 5,922,783 A | 7/1999 | Wojciak | 522/18 |
| 6,127,445 A | 10/2000 | Kutal et al. | 522/36 |

FOREIGN PATENT DOCUMENTS

| | | | | |
|---|---|---|---|---|
| EP | 0 278 685 | 8/1988 | | B32B/27/16 |
| EP | 0 393 407 | 10/1990 | | C09J/163/00 |
| EP | 0 769 721 | 4/1997 | | G03F/7/039 |
| WO | WO 98/38260 | 9/1998 | | C09J/4/04 |
| WO | WO 01/18068 | 3/2001 | | C08F/2/50 |

OTHER PUBLICATIONS

D.C. Neckers et al., Volumn VII Photoinitiation for Polymerization: UV & EB at the Millenium, pp. 116–119, 1998.*
S. Peter Pappas, Chapter 1 "Photoinitiators for Radical, Cationic and Concurrent Radical–Cationic Polymerization", pp. 10–1 date unknown.*
H.V Coover, D.W. Dreifus and J.T. O'Connor, "Cyanoacrylate Adhesives" in *Handbook of Adhesives*, 27, 463–77, I. Skeist, ed., Van Nostrand Reinhold, New York, 3$^{rd}$ ed. (1990).
J.G. Woods, "Radiation–Curable Adhesives" in *Radiation Curing: Science and Technology*, 333–98, 371, S.P. Pappas, ed., Plenum Press, New York (1992).
C. Kutal, P.A. Grutsch and D.B. Yang, "A Novel Strategy for Photoinitiated Anionic Polymerization" *Macromolecules*, 24, 6872–73 (1991).
D.B. Yang and C. Kutal, "Inorganic and Organometallic Photoinitiators" in *Radiation Curing: Science and Technology*, 21–55, S.P. Pappas, ed., Plenum Press, New York (1992).
"PRISM" Adhesive 4204, "Beyond a Simple Bond—Benefits of Adhesives Extend to Product and Process", *Design News* (Jan. 20, 1997).
"UV Curing: Science & Technology", vol. II, Technology Marketing Corporation, Norwalk, Connecticut, S.P. Pappas, ed., 1–13 (1985).

\* cited by examiner

*Primary Examiner*—Susan Berman
(74) *Attorney, Agent, or Firm*—Steven C. Bauman

(57) ABSTRACT

The present invention relates to a radiation-curable composition which includes a cyanoacrylate component or a cyanoacrylate-containing formulation, a metallocene component, a hydrogen abstraction photoinitiator, and hydrogen donor component to enhance the activity of the hydrogen abstraction photoinitiator.

33 Claims, No Drawings

RADIATION-CURABLE, CYANOACRYLATE-CONTAINING COMPOSITIONS

BACKGROUND OF THE INVENTION

1. Field of the Invention

The present invention relates to a radiation-curable composition which includes a cyanoacrylate component or a cyanoacrylate-containing formulation, a metallocene component, a hydrogen abstraction photoinitiator, and hydrogen donor component to enhance the activity of the hydrogen abstraction photoinitiator.

2. Brief Description of Related Technology

Cyanoacrylates generally are quick-setting materials which cure to clear, hard glassy resins, useful as sealants, coatings, and particularly adhesives for bonding together a variety of substrates [see e.g., H. V. Coover, D. W. Dreifus and J. T. O'Connor, "Cyanoacrylate Adhesives" in *Handbook of Adhesives*, 27, 463–77, I. Skeist, ed., Van Nostrand Reinhold, New York, 3rd ed. (1990)].

Ordinarily, upon contact with substrate materials possessing a surface nucleophile, cyanoacrylate-containing compositions spontaneously polymerize to form a cured material. The cured material exhibits excellent adhesive properties to materials such as metals, plastics, elastomers, fabrics, woods, ceramics and the like.

Cyanoacrylate-containing compositions are thus seen as a versatile class of single-component, ambient temperature curing adhesives.

As noted, cyanoacrylate polymerization is typically initiated using a nucleophile. The cyanoacrylate anionic polymerization reaction proceeds until all available cyanoacrylate monomer has been consumed and/or terminated by an acidic species.

Although the predominant mechanism by which cyanoacrylate monomers undergo polymerization is an anionic one, free-radical polymerization is also known to occur in this regard under prolonged exposure to heat or light of an appropriate wavelength. See e.g., Coover et al., supra. Ordinarily, however, free-radical stabilizers, such as quinones or hindered phenols, are included in cyanoacrylate-containing adhesive formulations to extend their shelf life. Thus, the extent of any free-radical polymerization of commercial cyanoacrylate-containing compositions is typically minimal and in fact is especially undesirable for at least the reason stated.

With conventional polymerizable compositions other than those containing cyanoacrylate monomers, radiation cure generally presents certain advantages over other known cure methods. Those advantages include reduced cure time, solvent elimination (which thereby reduces environmental pollution, and conserves raw materials and energy) and inducement of low thermal stressing of substrate material. Also, room temperature radiation cure prevents degradation of certain heat sensitive polymers, which may occur during a thermal cure procedure.

Radiation-curable, resin-based compositions are legion for a variety of uses in diverse industries, such as coatings, printing, electronic, medical and general engineering. Commonly, radiation-curable compositions are used for adhesives, and in such use the resin may ordinarily be chosen from epoxy- or acrylate-based resins.

Well-known examples of radiation-curable, epoxy-based resins include cycloaliphatic and bisphenol-A epoxy resins, epoxidized novolacs and glycidyl polyethers. [See e.g., U.S. Pat. No. 4,690,957 (Fujiokau) and European Patent Publication EP 278 685.] The common cure mechanism for such radiation-curable epoxy-based compositions is reported to be cationic polymerization.

Well-known examples of radiation-curable, acrylate-based resins include those having structural backbones of urethanes, amides, imides, ethers, hydrocarbons, esters and siloxanes. [See e.g., J. G. Woods, "Radiation-Curable Adhesives" in *Radiation Curing: Science and Technology*, 333–98, 371, S. P. Pappas, ed., Plenum Press, New York (1992).] The common cure mechanism for such radiation-curable, acrylate-based compositions is free-radical polymerization.

European Patent Publication EP 393 407 describes a radiation-curable composition which includes a slow cure cationic polymerizable epoxide, a fast cure free radical polymerizable acrylic component and a photoinitiator. Upon exposure to radiation, the photoinitiator is said to be capable of generating a cationic species which is capable of initiating polymerization of the epoxide and a free radical species which is capable of initiating polymerization of the acrylic component. The polymerizable acrylic component includes monofunctional acrylates and acrylate esters, such as cyano-functionalized acrylates and acrylate esters, examples of which are expressed as 2-cyanoethyl acrylate ($CH_2$=$CHCOOCH_2CH_2CN$) and 3-cyanopropyl acrylate ($CH_2$=$CHCOOCH_2CH_2CH_2CN$). (See page 5, lines 19–26.) The photoinitiator includes onium salts of Group Va, VIa and VIIa as well as iron-arene complexes, and generally metallocene salts, provided that the material chosen as the photoinitiator is said to be one which is capable of generating both a cationic species and a free radical species upon exposure to radiation. (See page 5, line 56–page 7, line 15.)

Other reported information regarding photopolymerizable compositions includes formulations containing epoxy compounds and metal complexes, such as disclosed in U.S. Pat. No. 5,525,698 (Böttcher).

In D. B. Yang and C. Kutal, "Inorganic and Organometallic Photoinitiators" in *Radiation Curing: Science and Technology*, 21–55, S. P. Pappas, ed., Plenum Press, New York (1992), cyclopentadienyl transition metal complexes are discussed with attention paid to ferrocene and titanocene. In the absence of halogenated media, Yang and Kutal report that ferrocene is photoinert, though in the presence of such media and a vinyllic source free radical initiated polymerization may occur.

And in C. Kutal, P. A. Grutsch and D. B. Yang, "A Novel Strategy for Photoinitiated Anionic Polymerization", *Macromolecules*, 24, 6872–73 (1991), the authors note that "[c]onspicuously absent from the current catalogue of photoinitiators are those that undergo photochemical release of an anionic initiating species." The authors also note that ethyl cyanoacrylate is "unaffected by prolonged (24-h) irradiation with light of wavelength >350 nm" whereas in the presence of $NCS^-$, cyanoacrylate is observed to solidify immediately, generating heat in the process. Though the $NCS^-$ was not in that case generated as a result of irradiation, it was generated from the Reineckate anion upon ligand field excitation thereof with near-ultraviolet/visible light.

While metallocenes (such as ferrocenes) have been employed in acrylate-based anaerobic adhesive compositions [see e.g., U.S. Pat. No. 3,855,040 (Malofsky), U.S. Pat. No. 4,525,232 (Rooney), U.S. Pat. No. 4,533,446 (Conway) and EP '407], it is not believed that to date a cyanoacrylate-based adhesive composition has been developed including therein a metallocene as defined herein, particularly with respect to curing through a photoinitiated mechanism.

U.S. Pat. No. 4,707,432 (Gatechair) speaks to a free radical polymerizable composition which includes (a) polymerizable partial esters of epoxy resins and acrylic and/or methacrylic resins, and partial esters of polyols and acrylic acid and/or methacrylic acid, and (b) a photoinitiator blend of a cyclopentadienyl iron complex and a sensitizer or photoinitiator, such as an acetophenone.

In C. Kutal, P. A. Grutsch and D. B. Yang, "A Novel Strategy for Photoinitiated Anionic Polymerization", *Macromolecules,* 24, 6872–73 (1991), the authors note that ethyl cyanoacrylate is "unaffected by prolonged (24-h) irradiation with light of wavelength >350 nm" whereas in the presence of NCS⁻, cyanoacrylate is observed to solidify immediately, generating heat in the process. Though the NCS⁻ was not in that case generated as a result of irradiation, it was generated from the Reineckate anion upon ligand field excitation thereof with near-ultraviolet/visible light. See also U.S. Pat. No. 5,652,280 (Kutal) U.S. Pat. No. 5,691,113 (Kutal) and U.S. Pat. No. 5,877,230 (Kutal), and U.S. Pat. No. 6,127,445 (Kutal), in which expensive metallocenes are described.

International Patent Application PCT/US98/03819 describes photocurable compositions including a cyanoacrylate component, a metallocene component and a photoinitiator component. More specific examples of photoinitiators are claimed in U.S. Pat. No. 5,922,783 (Wojciak).

European Patent Publication No. EP 769 721 A1 describes a photocurable composition of (a) an α-cyanoacrylate and (b) a metallocene compound comprising a transition metal of group VIII of the periodic table and aromatic electron system ligands selected from æ-arenes, indenyl, and η-cyclopentadienyl. The photocurable composition may further include (c) a cleavage-type photoinitiator. U.S. Pat. No. 5,824,180 (Mikuni) describes such compositions in the context of a method of bonding artificial nails. These European and U.S. patent documents show in their examples the ineffectiveness of the hydrogen abstraction type of photinitiators in photocurable cyanaocrylate compositions. More specifically, a series of comparative examples show that the photocurability (defined as the integral of the quantity of light needed for complete photocuring) of such photocurable compositions with the photoinitiator being of the hydrogen abstraction type was 8 to 17 times less effective when contrasted to equal amounts of a cleavage type photoinitiator, and a ferrocene or ferrocene derivative.

In "UV Curing: Science & Technology", Vol. II, Technology Marketing Corporation, Norwalk, Conn., S. P. Pappas, ed., 1–13 (1985), photoinitiators which undergo intramolecular bond cleavage, termed "P1 photoinitiators", and photoinitiators which undergo intermolecular hydrogen abstraction, termed "P2 photoinitiators", are discussed and examples of each of which are set forth.

International Patent Application PCT/US00/24620 describes photocurable compositions including a cyanoacrylate component, a photoinitiated radical generating component and a photoinitiator component. These compositions are reported to cure through photo-induced free radical polymerization mechanisms.

It is not believed to date that a cyanoacrylate-based adhesive composition has been developed to rapidly cure through a photoinitiated free radical mechanism, while retaining commercially acceptable shelf life stability. Such a composition component would be desirable as possessing the benefits and advantages of cyanoacrylate-containing compositions while curing through at least a photo-induced free radical polymerization mechanism.

Accordingly, a photocurable composition including a cyanoacrylate component, a metallocene component and a hydrogen abstraction photoinitiator component would be desirable as possessing the benefits and advantages of cyanoacrylate-containing compositions while curing through at least a photo-induced polymerization mechanism. And particularly with respect to U.S. Pat. No. 5,652,280 (Kutal) U.S. Pat. No. 5,691,113 (Kutal) and U.S. Pat. No. 5,877,230 (Kutal) and U.S. Pat. No. 6,127,445 (Kutal), avoiding the use of expensive metallocenes.

SUMMARY OF THE INVENTION

The present invention meets the desire expressed above by providing compositions which include a cyanoacrylate component or a cyanoacrylate-containing formulation, a metallocene component, a hydrogen abstraction photoinitiator, and hydrogen donor component to enhance the activity of the hydrogen abstraction photoinitiator. Desirably, such compositions are curable after exposure to radiation in the electromagnetic spectrum. Accordingly, in such radiation or photocurable compositions a polymerizingly effective amount of the hydrogen abstraction photoinitiator should be used.

The photocurable compositions of this invention retain those benefits and advantages of traditional cyanoacrylate-containing compositions while curing through at least a photo-induced polymerization mechanism, thereby providing to the compositions (and cured reaction products formed therefrom) the benefits and advantages of curing through such a mechanism. More specifically, photocurable compositions according to this invention cure rapidly, and in so doing minimize the opportunity for undesirable blooming or crazing formation in the cured reaction product. In addition, the inventive photocurable compositions avoid the use of expensive metallocenes, in contrast to those definded by U.S. Pat. No. 5,652,280 (Kutal) U.S. Pat. No. 5,691,113 (Kutal), and U.S. Pat. No. 5,877,230, (Kutal) and U.S. Pat. No. 6,127,445 (Kutal).

In another aspect of the present invention, there is provided a method of polymerizing a photocurable composition by providing an amount of the composition to a desired surface and exposing the composition to radiation in an amount sufficient to effect cure thereof.

In yet another aspect of the present invention, there is provided the cured reaction product formed from a photocurable composition after exposure thereof to a curingly effective amount of radiation.

The present invention will be more readily appreciated by those persons of skill in the art based on a reading of the detailed description of the invention which follows and the examples presented thereafter for illustrative purposes.

DETAILED DESCRIPTION OF THE INVENTION

As noted above, this invention relates to photocurable compositions which include a cyanoacrylate component or a cyanoacrylate-containing formulation, a metallocene component, a hydrogen abstraction photoinitiator, and a hydrogen donor component.

The cyanoacrylate component or cyanoacrylate-containing formulation includes cyanoacrylate monomers which may be chosen with a raft of substituents, such as those represented by $H_2C=C(CN)-COOR$, where R is selected from $C_{1-15}$ alkyl, alkoxyalkyl, cycloalkyl, alkenyl, aralkyl, aryl, allyl and haloalkyl groups. Desirably, the cyanoacrylate monomer is selected from methyl cyanoacrylate, ethyl-2-cyanoacrylate, propyl cyanoacrylates, butyl cyanoacrylates, octyl cyanoacrylates, allyl-2-cyanoacrylate, β-methoxyethyl-2-cyanoacrylate and combinations thereof. A particularly desirable cyanoacrylate monomer for use herein is ethyl-2-cyanoacrylate.

A variety of organometallic materials are also suitable for use herein. Those materials of particular interest herein may be represented by metallocenes within structure I:

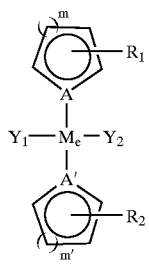

I

Within metallocene structure I, well-suited metallocene materials may be chosen from within metallocene structure II:

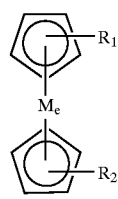

II where $R_1$, $R_2$ and $M_e$ are as defined above.

Particularly well-suited metallocene materials from within structure I may be chosen where $R_1$, $R_2$, $Y_1$, $Y_2$, m and m' are as defined above, and $M_e$ is chosen from Ti, Cr, Cu, Mn, Ag, Zr, Hf, Nb, V and Mo.

Desirably, the metallocene is selected from ferrocenes (i.e., where $M_e$ is Fe), such as ferrocene, vinyl ferrocenes, ferrocene derivatives, such as butyl ferrocenes or diarylphosphino metal-complexed ferrocenes [e.g., 1,1-bis (diphenylphosphino) ferrocene-palladium dichloride], titanocenes (i.e., where $M_e$ is Ti), such as bis($\eta^5$-2,4-cyclopentadien-1-yl)-bis-[2,6-difluoro-3-(1H-pyrrol-1-yl) phenyl] titanium which is available commercially from Ciba Specialty Chemicals, Tarrytown, N.Y. under the tradename "IRGACURE" 784DC, and derivatives and combinations thereof. A particularly desirable metallocene is ferrocene.

And bis-alkylmetallocenes, for instance, bis-alkylferrocenes (such as diferrocenyl ethane, propanes, butanes and the like) are also desirable for use herein, particularly since about half of the equivalent weight of the material (as compared to a non-bis-metallocene) may be employed to obtain the sought-after results, all else being unchanged. Of the these materials, diferrocenyl ethane is particularly desirable.

A number of hydrogen abstraction photoinitiators may be employed herein to provide the benefits and advantages of the present invention to which reference is made above. Such photoinitiators enhance the rapidity of the curing process when the photocurable compositions as a whole are exposed to electromagnetic radiation.

Examples of suitable hydrogen abstraction photointiators for use herein include, but are not limited to, diaryl ketones, such as benzophenone, xanthone, benzil (dibenzoyl), and benzanthrone; pentadione; 2,3-butanedione (diacetyl); quinone derivatives, such as thioxanthrenequinone ("TXAQ"), phenanthrenequinone ("PAQ"), ethylanthraquinone ("EAQ"), 1,4-chrysenequinone, anthraquinone ("AQ"), and camphorquinone ("CQ"); pyrene (benzophenanthrene); benzanthrone and combinations thereof.

In addition, it may be desirable to use cleavage photinitiators in combination with the hydrogen abstraction photoinitiator. In such case, cleavage photoinitiators may be chosen from commercially available ones, such as 1-hydroxycyclohexyl phenyl ketone, 2-methyl-1-[4-(methylthio)phenyl]-2-morpholino propan-1-one, 2-benzyl-2-N,N-dimethylamino-1-(4-morpholinophenyl)-1-butanone, 2,2-dimethoxy-2-phenyl acetophenone, bis(2,6-dimethoxybenzoyl-2,4,4-trimethyl pentyl) phosphine oxide, 2-hydroxy-2-methyl-1-phenyl-propan-1-one, bis(2,4,6-trimethyl benzoyl) phenyl phosphine oxide, 2,4,6-trimethylbenzoyldiphenyl-phosphine oxide, bis($\eta^5$-2,4-cyclopentadien-1-yl)-bis[2,6-difluoro-3-(1H-pyrrol-1-yl) phenyl]titanium and combinations thereof. In addition, alkyl pyruvates, such as methyl, ethyl, propyl, and butyl pyruvates, and aryl pyruvates, such as phenyl, benzyl, and where $R_1$ and $R_2$ may be the same or different and may occur at least once and up to as many four times on each ring in the event of a five-membered ring and up to as many as five times on each ring in the event of a six-membered ring;

$R_1$ and $R_2$ may be selected from H; any straight- or branched-chain alkyl constituent having from 1 to about 8 carbon atoms, such as $CH_3$, $CH_2CH_3$, $CH_2CH_2CH_3$, $CH(CH_3)_2$, $C(CH_3)_3$ or the like; acetyl; vinyl; allyl; hydroxyl; carboxyl; —$(CH_2)_n$—OH, where n may be an integer in the range of 1 to about 8; —$(CH_2)_n$—$COOR_3$, where n may be an integer in the range of 1 to about 8 and $R_3$ may be any straight- or branched-chain alkyl constituent having from 1 to about 8 carbon atoms; H; Li; Na; or —$(CH_2)_{n'}$, where n' may be an integer in the range of 2 to about 8; —$(CH_2)_n$—$OR_4$, wherein n may be an integer in the range of 1 to about 8 and $R_4$ may be any straight- or branched-chain alkyl constituent having from 1 to about 8 carbon atoms; or —$(CH_2)_n$—$N^+(CH_3)_3X^-$, where n may be an integer in the range of 1 to about 8 and X may be $Cl^-$, $Br^-$, $I^-$, $ClO_4^-$ or $BF_4^-$;

$Y_1$ and $Y_2$ may not be present at all, but when at least one is present they may be the same or different and may be selected from H, $Cl^-$, $Br^-$, $I^-$, cyano, methoxy, acetyl, hydroxy, nitro, trialkylamines, triaryamines, trialkylphospines, triphenylamine, tosyl and the like;

A and A' may be the same or different and may be C or N;

m and m' may be the same or different and may be 1 or 2; and $M_e$ is Fe, Ti, Ru, Co, Ni, Cr, Cu, Mn, Pd, Ag, Rh, Pt, Zr, Hf, Nb, V, Mo and the like.

Of course, depending on valence state, the element represented by $M_e$ may have additional ligands—$Y_1$ and $Y_2$—associated therewith beyond the carbocyclic ligands depicted above (such as where $M_e$ is Ti and $Y_1$ and $Y_2$ are $Cl^-$).

Alternatively, metallocene structure I may be modified to include materials such as:

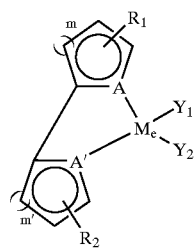

where $R_1$, $R_2$, $Y_1$, $Y_2$, A, A', m, m' and $M_e$ are as defined above. A particularly desirable example of such a material is where $R_1$ and $R_2$ are each H; $Y_1$ and $Y_2$ are each Cl; A and A' are each N; m and m' are each 2 and $M_e$ is Ru.

appropriately substituted derivatives thereof, may also be used in combination with the hydrogen abstraction photoinitiators.

The hydrogen donor component ordinarily has one or more labile hydrogens attached to a carbon, which itself is attached either to a heteroatom, such as oxygen, or to a point of unsaturation. A variety of such materials may be used in the present invention. For instance, ethers, alcohols and allylic compounds are well suited to donote hydrogen, particularly where the ether and alcohol contain more than one such group per molecule, and the allylic compound has more than one allylic hydrogen. For instance, polyalkylene oxides, polyalkylene (meth)acrylates, polyalkylene di(meth) acrylates, and cyclic ethers (such as tetrahydrofuran and derivatives thereof), and crown ethers are but a few general examples. Specific examples within those groups include polyethylene glycol diacrylate ("PEGDA"), polyethylene glycol dimethacrylate ("PEGDMA"), tetrahydrofuran ("THF"), 18 crown 6, and hydrogoxy-terminated polyethylene glycol.

Other examples include calixarenes and oxacalixarenes, silacrowns, cyclodextrins, and various ethoxylated hydric compounds.

With respect to formulating photocurable compositions, generally the components may be introduced to one another in any convenient order. Alternatively, it may be desirable to prepare a premix of the metallocene component and the hydrogen abstraction photoinitiator component. In this way, a ready made premix of those components may be added to the cyanoacrylate component of the formulation to allow for a quick and easy one-part formulation of a photocurable composition prior to dispensing and curing thereof.

For packaging and dispensing purposes, it may be desirable for photocurable compositions in accordance with the present invention to be relatively fluid and flowable. Variations in the viscosity thereof may also be desirable in certain applications and may be readily achieved through routine changes in formulation, the precise changes being left to those persons of ordinary skill in the art.

For instance, ordinarily cyanoacrylate-containing compositions free from an added thickener or viscosity modifier are low viscosity formulations (such as in the range of 1 to 15 cps). While a composition with such a viscosity (or one whose viscosity has been modified to be up to about five times that viscosity) may be appropriate for a wicking application where a small gap exists between substrates to be bound (e.g., less than about 0.1 mils (0.00254 mm)) and/or an application where enhanced cure speed is desirable, such a viscosity may be too low for convenient use in certain industrial applications. At least for this reason, the viscosity of cyanoacrylate-containing compositions has at times been desirably modified through, for instance, the addition of polymethylmethacrylates and/or fumed silicas. See e.g., U.S. Pat. No. 4,533,422 (Litke) and U.S. Pat. No. Re. 32,889 (Litke), the disclosures of each of which are hereby expressly incorporated herein by reference.

A medium viscosity formulation (such as in the range of 100 to 300 cps) may be more appropriate in applications where greater control of flowability is desirable such as bonding together molded polymeric parts. And a high viscosity formulation (such as in the range of 600 to 1000 cps) may be more appropriate in applications involving porous substrates and/or substrates with larger gaps (such as greater than about 0.5 mils (0.0127 mm)).

Of course, those of ordinary skill in the art should make appropriate decisions regarding whether a viscosity modifier should be included in the photocurable composition, and if so which one(s) and at what level should one be included to achieve the desired viscosity for the intended applications.

In addition, it may be desirable to toughen the cured photocurable compositions of the present invention through the addition of elastomeric rubbers such as is taught by and claimed in U.S. Pat. No. 4,440,910 (O'Connor), the disclosure of which is hereby expressly incorporated herein by reference. It may also be desirable to improve the hot strength of the cured photocurable compositions by addition of anhydrides, such as is taught by and claimed in U.S. Pat. No. 4,450,265 (Harris) and the documents cited therein, the disclosures of each of which are hereby expressly incorporated herein by reference.

Moreover, the compositions of the present invention may be rendered into a thixotropic paste through addition of powdered organic fillers having a particle size of about 2 to 200 microns as is taught by U.S. Pat. No. 4,105,715 (Gleave) or thickened by a copolymer or terpolymer resin to improve peel strength as is taught by U.S. Pat. No. 4,102,945 (Gleave), the disclosures of each of which are hereby incorporated herein by reference.

Further, the compositions of the present invention may be rendered more resistant to thermal degradation at elevated temperature conditions by the inclusion of certain sulfur-containing compounds, such as sulfonates, sulfinates, sulfates and sulfites as set forth in U.S. Pat. No. 5,328,944 (Attarwala), the disclosure of which is hereby expressly incorporated herein by reference. The inclusion of such compounds in the photocurable compositions of the present invention renders those compositions well-suited for applications in which elevated temperature conditions may be experienced, such as with potting compounds particularly where large cure through volume is present and non-tacky surfaces are desirably formed in less than about five seconds.

The inclusion of such materials to a photocurable composition in accordance with the present invention may provide a formulation having particular advantages for certain applications, and at least in the case of viscosity modifiers should be appealing from a safety perspective as the possibility is decreased of splashing or spilling the composition on exposed skin of the user or bystanders. In addition, since the parts to be bonded with the inventive compositions are fixed by exposure to UV radiation, there is less of a chance for the assembler to touch or contact an uncured fillet.

The relative amount of the various components of the photocurable compositions according to this invention is a matter of choice left to those persons of skill in the art, depending of course on the identity of the particular components chosen for a specific composition. As a general guide, however, it is desirable to include in the photocurable compositions a metallocene, such as ferrocene, in an amount within the range of about 0.005% to about 4% (desirably within the range of about 0.01% to about 1.5%) by weight of the total composition. The compositions also include a hydrogen abstraction photoinitiator, such as PAQ, in an amount within the range of about 0.125% to about 5% by weight of the composition, with about 0.5% to about 2% by weight of the total composition being desirable. In addition, the compositions include a hydrogen donor component, such as PEGDA or PEGDMA, in an amount within the range of about 0.125% to about 10% by weight of the composition, with about 0.5% to about 4% by weight of the total composition being desirable. The balance of the composition is composed predominantly of a cyanoacrylate component, such as ethyl-2-cyanoacrylate. Of course, the amount of all the components together in the composition totals 100%.

While the inventive photocurable compositions may include a variety of recited components in various ranges, a particularly desriable formulation is based on ethyl-2-cyanoacrylate, stabilized with 20 ppm boron trifluoride, 0.015% ferrocene, 0.5% PAQ, and 2.0% PEGDA, by weight of the total composition.

A method of curing a photocurable composition in accordance with this invention is also provided herein, the steps of which include (a) providing onto a desired substrate an amount of a photocurable composition; and (b) subjecting the composition to radiation sufficient to effect cure thereof.

The amount of photocurable composition provided should be sufficient to cure and form an adequate bond to the substrate surfaces between which it is applied. For instance, application of the photocurable composition may be achieved by dispensing the composition in drop-wise fashion, or as a liquid stream, brush-applied, dipping, and the like, to form a thin film. Application of the photocurable composition may depend on the flowability or viscosity of the composition. To that end, viscosity modifiers, as noted above, may be included in the composition.

In use, such compositions are desirably readily dispensed onto a portion of a desired surface of a substrate onto which is to be bonded a portion of another substrate. The photocurable composition may be applied to certain portions of the substrate surface or over the entire surface of the substrate to be bonded, depending on the particular application.

The source of radiation emitting electromagnetic waves is selected from ultraviolet light, visible light, electron beam, x-rays, infrared radiation and combinations thereof. Desirably, ultraviolet light is the radiation of choice, with appropriate sources including "H", "D", "V", "X", "M" and "A" lamps, mercury arc lamps, and xenon arc lamps (such as those commercially available from Loctite Corporation, Rocky Hill, Conn., Fusion UV Curing Systems, Buffalo Grove, Ill. or Spectroline, Westbury, N.Y.); microwave-generated ultraviolet radiation; solar power and fluorescent light sources. Any of these electromagnetic radiation sources may use in conjunction therewith reflectors and/or filters, so as to focus the emitted radiation onto a specific portion of a substrate onto which has been dispensed a photocurable composition and/or within a particular region of the electromagnetic spectrum. Similarly, the electromagnetic radiation may be generated directly in a steady fashion or in an intermittent fashion so as to minimize the degree of heat build-up. Although the electromagnetic radiation employed to cure the photocurable compositions into desired reaction products is often referred to herein as being in the ultraviolet region, that is not to say that other radiation within the electromagnetic spectrum may not also be suitable. For instance, in certain situations, radiation in the visible region of the electromagnetic spectrum may also be advantageously employed, whether alone or in combination with, for instance, radiation in the ultraviolet region. Of course, microwave and infrared radiation may also be advantageously employed under appropriate conditions.

Higher or lower radiation intensities, greater or fewer exposures thereto and length of exposure and/or greater or lesser distances of the source of radiation to the composition may be required to complete curing, depending of course on the particular components of a chosen composition.

More specifically with respect to radiation intensity, the chosen lamp should have a power rating of at least about 100 watts per inch (about 40 watts per cm), with a power rating of at least about 300 watts per inch (about 120 watts per cm) being particularly desirable. Also, since the inclusion of a photoinitiator in the composition may shift the wavelength within the electromagnetic radiation spectrum at which cure occurs, it may be desirable to use a source of electromagnetic radiation whose variables (e.g., wavelength, distance, and the like) are readily adjustable.

During the curing process, the composition will be exposed to a source of electromagnetic radiation that emits an amount of energy, measured in $KJ/m^2$, determined by parameters including: the size, type and geometry of the source; the duration of the exposure to electromagnetic radiation; the intensity of the radiation (and that portion of radiation emitted within the region appropriate to effect curing); the absorbency of electromagnetic radiation by any intervening materials, such as substrates; and the distance the composition lies from the source of radiation. Those persons of skill in the art should readily appreciate that curing of the composition may be optimized by choosing appropriate values for these parameters in view of the particular components of the composition.

To effect cure, the source of electromagnetic radiation may remain stationary while the composition passes through its path. Alternatively, a substrate coated with the photocurable composition may remain stationary while the source of electromagnetic radiation passes thereover or therearound to complete the transformation from composition to reaction product. Still alternatively, both may traverse one another, or for that matter remain stationary, provided that the photocurable composition is exposed to electromagnetic radiation sufficient to effect cure.

Commercially available curing systems, such as the "ZETA" 7200 or 7400 ultraviolet curing chamber (Loctite Corporation, Rocky Hill, Conn.), Fusion UV Curing Systems F-300 B (Fusion UV Curing Systems, Buffalo Grove, Ill.), Hanovia UV Curing System (Hanovia Corp., Newark, N.J.), BlackLight Model B-100 (Spectroline, Westbury, N.Y.) and RC500 A Pulsed UV Curing System (Xenon Corp., Woburn, Mass.), are well-suited for the purposes described herein. Also, a Sunlighter UV chamber fitted with low intensity mercury vapor lamps and a turntable may be employed herein.

The required amount of energy may be delivered by exposing the composition to a less powerful source of electromagnetic radiation for a longer period of time, through for example multiple passes, or alternatively, by exposing the composition to a more powerful source of electromagnetic radiation for a shorter period of time. In addition, each of those multiple passes may occur with a source at different energy intensities. In any event, those persons of skill in the art should choose an appropriate source of electromagnetic radiation depending on the particular composition, and position that source at a suitable distance therefrom which, together with the length of exposure, optimizes transformation. Also, it may be desirable to use a source of electromagnetic radiation that is delivered in an intermittent fashion, such as by pulsing or strobing, so as to ensure a thorough and complete cure without causing excessive heat build-up.

A reaction product is also of course provided by the teaching of this invention. The reaction product is formed from photocurable compositions after exposure thereof to electromagnetic radiation sufficient to effect cure of the composition. The reaction product is formed rapidly, and ordinarily and desirably without observed formation of blooming or crazing, see infra.

The reaction product of the photocurable composition may be prepared by dispensing in low viscosity or liquid form a photocurable composition in accordance with present invention onto a substrate and mating that substrate with a second substrate to form an assembly. Thereafter, exposure to electromagnetic radiation on at least one substrate of the assembly for an appropriate period of time should transform the photocurable composition into an adhesive reaction product.

Since the photocurable compositions of the present invention cure to form reaction products through, as their description connotes, a photo-initiated mechanism, the composition and the surface of the substrate on which the composition is placed should be exposed to the source of electromagnetic radiation. The choice of substrate may affect the rate and degree at which cure occurs of the photocurable compositions of the present invention. For instance, it is desirable for the substrates to be bonded together to be substantially free of electromagnetic radiation-absorbing capabilities. That is, the greater degree of electromagnetic radiation transmitting capability the substrate possesses, the greater the rate and degree of cure of the composition, all else being equal of course.

Blooming or crazing may be observed when compositions cure into reaction products and the cure itself is incomplete. That is, blooming refers to the evaporation of cyanoacrylate monomer (due to its relatively high vapor pressure) from uncured fillets, the result of which is formation of a precipitate on surfaces adjacent to the bond line which are also observed as a white haze. Crazing refers to the formation of stress cracks on certain synthetic materials, such as polycarbonates, acrylics and polysulfones, due in this instance to the presence thereon of cyanoacrylate monomer.

The result of incomplete curing may be observed with respect to adhesive uses of the photocurable composition as adhesive or cohesive failure of the cured composition when applied to or between substrates. Such observations may be minimized or even eliminated by using electromagnetic radiation transmitting (as contrasted to absorbing) substrates and placing the source of electromagnetic radiation at a strategic location so as to improve the degree of electromagnetic radiation to which the composition on the substrate is exposed. Similarly, additional sources of electromagnetic radiation, or as stated above reflectors which redirect onto desired portions of the substrate stray or errant electromagnetic radiation, may be employed to further enhance cure.

Accordingly, the compositions of this invention provide a number of benefits and advantages. These include: use of readily available and inexpensive raw materials, particularlry the hydrogen abstraction photoinitiator and hydrogen donor component; a built-in secondary cure system (i.e., photo-initiation in addition to the ordinary cyanoacrylate anionic initiation), which is particularly attractive in those applications where certain of the substrates which may be used in the assembly do not allow the transmission of light, rendering another type of adhesive (such as a dual cure acrylic adhesive) less desirable because a secondary heating step would then be required; elimination of a substrate primer step, which obviates the use of often flammable materials and invites automated processes; improves the cure though gap; reduces the cost of raw materials over certain alternative technologies; and the provision of a degree of flexibility to the cured products.

In view of the above description of the present invention, it is evident that a wide range of practical opportunities is provided by the teaching herein. Certain of those practical opportunities are exemplified below, as are many of the advantages and benefits of the present invention. However, the invention as so exemplified is for illustrative purposes only and is not to be construed in any way as limiting the broad aspects of the teaching herein provided.

EXAMPLES

Example 1

In this example, reproduced in Table 1 are photocurability evaluations of ethyl-2-cyanoacrylate with ferrocene and certain derivatives thereof are introduced to either a P1 photoinitiator or a P2 photoinitiator. The evaluations are excerpted from European Patent Document EP 769 721 A1.

In contrast to the working examples set forth below, the EP '721 patent document, which describes a photocurable composition of (a) a 2-cyanoacrylate and (b) a metallocene compound comprising a transition metal of group VIII of the periodic table and aromatic electron system ligands selected from æ-arenes, indenyl, and η-cyclopentadienyl, and optionally (c) a cleavage-type photoinitiator, shows the ineffectiveness of the hydrogen abstraction type of photoinitiators ("P2 photoinitiator") in photocurable cyanoacrylate compositions, as contrasted with cleavage type photoinitiators ("P1 photoinitiators"), which forms part of the claimed technology. More specifically, the comparative examples set forth in Table 1 indicate the photocurability to be less effective by 8 to 17 times when a P2 photoinitiator is chosen rather than a P1 photoinitiator, together with ethyl-2-cyanoacrylate (Threebond product, TB 1741) and a ferrocene or ferrocene derivative, all else being equal. And as shown by the claims of the EP '721 patent document, the cleavage photoinitiator, or P1 photoinitiator, forms part of the technology defined thereby.

TABLE 1

| | Photoinitiator (Amt/Rpm) | | Metallocene | Metallocene | | Photcurability |
|---|---|---|---|---|---|---|
| Sample No. | Type | Identity | (ppm) | Type | Amount (ppm) | (mJ/cm$^2$) |
| Ex. 6 | P1 | APO | 1,000 | Cp$_2$Fe | 5,000 | 1,000 |
| Comp. Ex. 8 | P2 | Benzophenone | 5,000 | — | — | — |
| Comp. Ex. 9 | | Benzanthrone | 1,000 | — | — | — |
| Comp. Ex. 10 | | PAC | 1,000 | — | — | 20,000< |
| Comp. Ex. 11 | | Benzophenone | 5,000 | Cp$_2$Fe | 5,000 | 15,000 |
| Comp. Ex. 12 | | Benzanthrone | 1,000 | Cp$_2$Fe | 5,000 | 20,000< |
| Comp. Ex. 13 | | PAC | 1,000 | Cp$_2$Fe | 5,000 | 16,000 |
| Comp. Ex. 15 | P1 | APO | 1,000 | (EtCp)CpFe | 5,000 | 1,000 |
| Comp. Ex. 14 | P2 | Benzophenone | 5,000 | (EtCp)CpFe | 5,000 | 6,000 |
| Comp. Ex. 15 | | Benzanthrone | 1,000 | (EtCp)CpFe | 5,000 | 7,000 |
| Comp. Ex. 16 | | PAC | 1,000 | (EtCp)CpFe | 5,000 | 16,000 |
| Ex. 23 | P1 | APO | 1,000 | (BuCp)CpFe | 5,000 | 1,000 |
| Comp. Ex. 17 | P2 | Benzophenone | 5,000 | (BuCp)CpFe | 5,000 | 6,000 |
| Comp. Ex. 18 | | Benzanthrone | 1,000 | (BuCp)CpFe | 5,000 | 12,000 |
| Comp. Ex. 19 | | PAC | 1,000 | (BuCp)CpFe | 5,000 | 10,000 |
| Ex. 28 | P1 | APO | 1,000 | (AmCp)CpFe | 5,000 | 1,000 |
| Comp. Ex. 20 | P2 | Benzophenone | 5,000 | (AmCp)CpFe | 5,000 | 7,000 |
| Comp. Ex. 21 | | Benzanthrone | 1,000 | (AmCp)CpFe | 5,000 | 11,000 |
| Comp. Ex. 22 | | PAC | 1,000 | (AmCp)CpFe | 5,000 | 8,000 |
| Ex. 34 | P1 | APO | 1,000 | (BzoCp)CpFe | 5,000 | 9,000 |
| Comp. Ex. 23 | P2 | Benzophenone | 5,000 | (BzoCp)CpFe | 5,000 | 18,000 |

TABLE 1-continued

| Sample No. | Photoinitiator (Amt/Rpm) Type | Identity | Metallocene (ppm) | Type | Metallocene Amount (ppm) | Photcurability (mJ/cm$^2$) |
|---|---|---|---|---|---|---|
| Comp. Ex. 24 | | Benzanthrone | 1,000 | (BzoCp)CpFe | 5,000 | 16,000 |
| Comp. Ex. 25 | | PAC | 1,000 | (BzoCp)CpFe | 5,000 | 17,000 |
| Ex. 39 | P1 | APO | 1,000 | (CypeCp)CpFe | 5,000 | 2,000 |
| Comp. Ex. 26 | P2 | Benzophenone | 5,000 | (CypeCp)CpFe | 5,000 | 10,000 |
| Comp. Ex. 27 | | Benzanthrone | 1,000 | (CypeCp)CpFe | 5,000 | 11,000 |
| Comp. Ex. 28 | | PAC | 1,000 | (CypeCp)CpFe | 5,000 | 11,000 |
| Ex. 44 | P1 | APO | 1,000 | (CypeCp)CpFe | 5,000 | 3,000 |
| Comp. Ex. 29 | P2 | Benzophenone | 5,000 | (CypeCp)CpFe | 5,000 | 14,000 |
| Comp. Ex. 30 | | Benzanthrone | 1,000 | (CypeCp)CpFe | 5,000 | 13,000 |
| Comp. Ex. 31 | | PAC | 1,000 | (CypeCp)CpFe | 5,000 | 13,000 |
| Ex. 50 | P1 | APO | 5,000 | (CaAlCp)CpFe | 5,000 | 7,000 |
| Comp. Ex. 32 | P2 | Benzophenone | 5,000 | (CaAlCp)CpFe | 5,000 | 14,000 |
| Comp. Ex. 33 | | Benzanthrone | 1,000 | (CaAlCp)CpFe | 5,000 | 15,000 |
| Comp. Ex. 34 | | PAC | 1,000 | (CaAlCp)CpFe | 5,000 | 13,000 |

Cp$_2$Fe means ferrocene; (EtCp)CpFe means ethylferrocene; (BuCp)CpFe means butyl ferrocene; (AmCp)CpFe means tet-amyl ferrocene; (BzoCp)CpFe means benzoyl ferrocene; (CyheCp)CpFe means cyclohexenyl ferrocene; (Cype)CpFe means cyclo pentenyl ferrocene; and (CAlCp)CpFe means ferrocene carboxyaldehyde.
The P1 photoinitiator, referred to as APO, is listed in the "Ex." Entries and various P2 photoinitiators are listed as "Comp. Ex.".

Example 2

A photocurable composition in accordance with the present invention was prepared from about 95.9 grams of ethyl-2-cyanoacrylate, about 0.04 grams of ferrocene and about the identity and amount of hydrogen abstraction photoinitiator, as noted below in Table 2. In addition, a hydrogen donor component, PEGDA 400 (commercially available under the trade designation SR-344 from Sartomer Co., Pennsylvania) was included in the compositions in the amounts noted. Typically, commercially available cyanoacrylate-containing compositions (such as "PRISM" Adhesive 4061, from Loctite Corporation, Rocky Hill, Conn.) are stabilized against premature anionic polymerization by the addition of an acidic material, such as boron trifluoride or methane sulfonic acid. In this example, therefore, the ethyl cyanoacrylate contained about 20 ppm of boron trifluoride as an acid anionic stabilizer. Of course, greater or lesser amounts of boron triflouride or other acidic anionic stabilizers may be added for such purpose.

TABLE 2

| Sample No. | PEGDA 400 | Hydrogen Abstraction Photoinitiator | Amounts (wt. %) |
|---|---|---|---|
| 1 | 2.4 | Benzil | 3 |
| 2 | | | 1 |
| 3 | 3.2 | CQ | 3 |
| 4 | | | 1 |
| 5 | 2.6 | PAQ | 3 |
| 6 | | | 1 |
| 7 | 2.4 | Benzophenone | 3 |

The four components were added directly to a polyethylene vessel and mixed for a period of time of about thirty minutes at room temperature. Alternatively, the ethyl-2-cyanoacrylate and PAQ may be mixed together as a first premix, and the PEGDA 400 and the ferrocene may be mixed together as a second premix, and thereafter the two premixes mixed together.

Once the photocurable compositions were prepared, a drop or bead (about 0.2 grams) thereof was dispensed using a polyethylene pipet onto an ultraviolet transmitting acrylic substrate (whose dimensions were about 1×1×0.25 inches (2.54×2.54×0.63 cm), such as those available commercially from Industrial Safety Co.). More specifically, the composition was applied to the substrate, and thereafter introduced into a "ZETA" 7200 ultraviolet curing chamber, equipped with a five inch (12.7 cm) medium pressure mercury arc lamp (emitting light of a wavelength of about 300 to 365 nm). The substrate was placed in the chamber under the lamp at a distance of about 2 to 3 inches 5.08 cm to 7.62 cm), and exposed to the ultraviolet light emitted by the lamp at an intensity of about 271.5 mW/cm$^2$. A tack free surface was observed to form within 6 to 18 seconds, depending on the compositions, data for which are presented in Table 3.

TABLE 3

| Sample No. | Tack Free Time (secs) |
|---|---|
| 1 | 10 |
| 2 | 9 |
| 3 | 18 |
| 4 | 14 |
| 5 | 7 |
| 6 | 6 |
| 7 | 16 |

Example 3

In this example, photocurable compositions in accordance with the present invention were prepared from about 95.9 grams of ethyl-2-cyanoacrylate, either about 0.02 grams or about 0.04 grams of ferrocene and a hydrogen abstration photoinitiator with a varying amount thereof, and a varying amount of hydrogen donor component, PEGDA 400 (SR-344), as noted below in Tables 4a–4c.

TABLE 4a

| | Benzil PI | | |
|---|---|---|---|
| | Component (wt. %) | | |
| Sample No. | Cp$_2$Fe | PI | PEGDA 400 |
| 8 | 0.02 | 0.25 | — |
| 9 | 0.02 | 0.25 | 0.6 |

TABLE 4a-continued

Benzil PI

| Sample No. | Component (wt. %) | | |
|---|---|---|---|
| | Cp₂Fe | PI | PEGDA 400 |
| 10 | 0.02 | 0.5 | — |
| 11 | 0.02 | 0.5 | 0.6 |
| 12 | 0.04 | 1.0 | 1.2 |
| 13 | 0.04 | 1.0 | 2.4 |

TABLE 4b

CQ PI

| Sample No. | Component (wt. %) | | |
|---|---|---|---|
| | Cp₂Fe | PI | PEGDA 400 |
| 14 | 0.02 | 0.25 | — |
| 15 | 0.02 | 0.25 | 0.8 |
| 16 | 0.02 | 0.5 | — |
| 17 | 0.02 | 0.5 | 0.8 |
| 18 | 0.04 | 1.0 | 1.6 |
| 19 | 0.04 | 1.0 | 3.2 |

TABLE 4c

PAQ PI

| Sample No. | Component (wt. %) | | |
|---|---|---|---|
| | Cp₂Fe | PI | PEGDA 400 |
| 20 | 0.02 | 0.25 | — |
| 21 | 0.02 | 0.25 | 0.6 |
| 22 | 0.02 | 0.5 | — |
| 23 | 0.02 | 0.5 | 0.6 |
| 24 | 0.04 | 1.0 | 1.3 |
| 25 | 0.04 | 1.0 | 2.6 |

Sample Nos. 8–25 were prepared along the lines of the samples described in Example 2, supra.

Once prepared, about 10 mg of each sample was dispensed on a glass substrate and exposed to UV radiation as above. The data shown below in Table 4 provides information on Sample Nos. 8–25 regarding their ability to cure when exposed to electromagnetic radiation.

TABLE 5

| Sample No. | Tack Free Time (secs) |
|---|---|
| 8 | >10 |
| 9 | 13 |
| 10 | >10 |
| 11 | 15 |
| 12 | 12 |
| 13 | 10 |
| 14 | >10 |
| 15 | >10 |
| 16 | >10 |
| 17 | >10 |
| 18 | 13 |
| 19 | 14 |
| 20 | >10 |
| 21 | >10 |
| 22 | >10 |

TABLE 5-continued

| Sample No. | Tack Free Time (secs) |
|---|---|
| 23 | 9 |
| 24 | 15 |
| 25 | 7 |

As a control, ethyl-2-cyanoacrylate was exposed to UV radiation under the same conditions as the other samples, and no polymerization reaction was observed to occur.

Accelerated aging under slightly elevated temperature conditions (82° C.) showed a shelf life stability of between 1 and 5 days for these compositions. Under refrigerated conditions, the compositions fare better; some demonstrated shelf life stability of greater than 4 weeks.

Example 5

In this example, photocurable compositions in accordance with the present invention were prepared from about 95.9 grams of ethyl-2-cyanoacrylate, either about 0.02 grams or about 0.04 grams of ferrocene, PAQ as the hydrogen abstraction photoinitiator in varying amounts, and varying amounts of PEGDA 400 as the hydrogen donor component, as noted below in Table 5. In addition, these samples were stabilized against premature anionic polymerization with boron trifluoride in an amount from 20 to 50 ppm, in 10 ppm allotments.

TABLE 6

| Sample No. | Component (wt. %) | | |
|---|---|---|---|
| | Cp₂Fe | PAQ PI | PEGDA 400 |
| 26 | 0.04 | 0.5 | 2 |
| 27 | 0.04 | 0.5 | 2 |
| 28 | 0.04 | 0.5 | 2 |
| 29 | 0.04 | 0.5 | 2 |
| 30 | 0.04 | 0.25 | 2 |
| 31 | 0.04 | 0.25 | 2 |
| 32 | 0.04 | 0.25 | 2 |
| 33 | 0.04 | 0.25 | 2 |
| 34 | 0.04 | 0.1 | 2 |
| 35 | 0.04 | 0.1 | 2 |
| 36 | 0.04 | 0.1 | 2 |
| 37 | 0.04 | 0.1 | 2 |
| 38 | 0.04 | 0.5 | 1 |
| 39 | 0.04 | 0.5 | 1 |
| 40 | 0.02 | 0.5 | 1 |
| 41 | 0.02 | 0.5 | 1 |
| 42 | 0.04 | 0.5 | 0.5 |
| 43 | 0.04 | 0.5 | 0.5 |
| 44 | 0.02 | 0.5 | 0.5 |
| 45 | 0.02 | 0.5 | 0.5 |
| 46 | 0.04 | 0.5 | — |
| 47 | 0.04 | 0.5 | — |

As above, once prepared, about 10 mg of each sample was dispensed onto a glass substrate and exposed to UV radiation as above. The data shown below in Table 7 provides information on Sample Nos. 26–47 regarding their ability to cure when exposed to electromagnetic radiation and the shear strength (in psi), measured by bonding two lap shears together off set from one another, demonstrated after cure.

TABLE 7

| Sample No. | Tack Free Time (secs) | Shear Strength (psi) |
|---|---|---|
| 26 | 5 | 3082 |
| 27 | 6 | 2734 |
| 28 | 7 | 1672 |
| 29 | 8 | 1444 |
| 30 | 6 | 2450 |
| 31 | 7–8 | 2256 |
| 32 | 9 | 1238 |
| 33 | 11 | 868 |
| 34 | 6 | 588 |
| 35 | 10 | <100 |
| 36 | 12 | <100 |
| 37 | 15 | <100 |
| 38 | 5 | 3144 |
| 39 | 7 | 2066 |
| 40 | 10 | 2902 |
| 41 | 9 | 2744 |
| 42 | 20 | 3286 |
| 43 | 32 | 1014 |
| 44 | 21 | 3552 |
| 45 | 25 | 2614 |
| 46 | 37 | 472 |
| 47 | 46 | 242 |

As a control, ethyl-2-cyanoacrylate was exposed to UV radiation under the same conditions as Sample Nos. 26–47, and no polymerization reaction was observed to occur.

Example 6

The photocurable compositions of the present invention may be used in far flung manufacturing opportunities.

For instance, a variety of equipment for the medical industry may be manufactured using the inventive compositions, including, but not limited to, needles, tubesets, masks and catheters.

With respect to needles, syringes, lancets, hypodermics, injectors, bodily fluid (such as blood or urine) collector sets, cannula/hub assemblies and cannula/tube assemblies, such as those to be used in connection with dialysis processes are but a few examples of needles for the medical industry which may be manufactured with the composition of this invention.

Generally, in the manufacture of needles for which a cannula is inserted into a cavity within a hub and is to be affixed therein, dispensing a pre-determined amount of the inventive compositions and subjecting the assembly to UV radiation allows a quick fixation which will cure through the shadow area by the ordinary cyanoacrylate anionic cure mechanism to a full-strength bond within 24 hours.

Moreover, with respect to those needle assemblies which aim at being tamper proof and which provide a cap, the inventive composition may be placed at the juncture between the cap and the collar in which may be placed a hub.

In addition, with respect to tubesets, intravenous sets, fluid delivery and withdrawal sets (such as drug delivery and blood withdrawal sets) and suction tubes are but a few examples of tubsets for the medical industry which may be manufactured with the composition of this invention.

In such instances, tubesets and connectors may be assembled with the inventive compositions by inserting one end of the tubing into the appropriate housing of a connector.

Avoiding the use of a primer composition is particularly attractive since solvents used in conventional primer compositions may cause the reaction product formed from conventional reactive adhesive compositions to be brittle and more susceptible to stress cracking. In contrast, the photocurable feature of the compositions of this invention allow the parts to become fixtured quickly, thereby permitting the conventional anionic-initiated cyanoacrylate cure mechanism to occur without fear of compromising the integrity of the bond formed.

Also, with respect to masks, anesthesia, face and surgical masks are but a few examples of equipment worn by providers of medical services, which may be manufactured with the composition of this invention.

And, with respect to catheters, angioplast and balloon-type catheters are but a few examples of types of catheters, which may be manufactured with the compositions of this invention.

Of course, other applications for the compositions of the present invention exist beyond those specifically exemplified above and are contemplated within the scope thereof, including, but not limited to, silk screening or disc drive applications; holographic applications where a phase hologram is prepared for optical information storage; magnetic sensor applications for door/window alarms where the magnet is bonded to the sensor housing using the inventive compositions so that the dead space within the housing is filled; attaching gauge needles to support posts (e.g., in automotive applications); bonding together cardboard holding cartridges for batteries; loud speaker assembly [see e.g., in the context of Loctite "PRISM" Adhesive 4204, "Beyond a Simple Bond—Benefits of Adhesives Extend to Product and Process", Design News (Jan. 20, 1997)] for which the inventive compositions may be used in at least five aspects of the assembly—attaching the spider (which aligns the voice coil to the magnet) to the frame, attaching the surround (which is connected to the case) to the frame, tacking the lead wires, attaching the dust cap to the cone, and attaching the voice coil to the spider and the cone; lens bonding applications; applications where blooming and crazing would be aesthetically unacceptable from a commercial perspective, such as in jewelry fabrication and repair applications where use of a thick fillet of cured material (such as a reaction product of the inventive compositions) would be desirable for structural mounting; electronic potting applications; and other applications where it would be desirable to obviate the need for the use of a primer material (which may be costly, contain an ozone-depleting material and/or may complicate the assembly process), for instance, the fastening of electronic wire tacking, and the like.

Also, electronic applications where outgassing is a conventional recurring problem may employ the photocurable compositions of this invention to decrease the heating time required to obtain a fully-cured reaction product of the composition, thereby decreasing outgassing which may occur.

While the present invention has been exemplified as shown above, it is clear that variations are also intended to be within the spirit and scope of the present invention and may be practiced in accordance herewith, with only routine, rather than undue, experimentation. Any variations and equivalents should provide suitable, if not comparable results, when viewed in connection with the results obtained from the above examples. Accordingly, such variations and equivalents are also intended to be encompassed by the claims.

What is claimed is:

1. A shelf stable photocurable composition comprising:
    (a) a 2-cyanoacrylate component,
    (b) a metallocene component, and
    (c) a photoinitiator component comprising the combination of a hydrogen abstraction photoinitiator and a hydrogen donor.

2. The composition according to claim 1, wherein the cyanoacrylate component includes a cyanoacrylate monomer represented by H₂C=C(CN)COOR, wherein is selected from the group consisting of $C_{1-15}$alkyl, alkoxyalkyl, cycloalkyl, alkenyl, aralkyl, aryl, allyl and haloalkyl groups.

3. The composition according to claim 1, wherein the cyanoacrylate monomer is selected from the group consisting of methyl cyanoacrylate, ethyl-2-cyanoacrylate, propyl cyanoacrylates, butyl cyanoacrylates, octyl cyanoacrylates, allyl-2-cyanoacrylate, β-methoxyethyl-2-cyanoacrylate and combinations thereof.

4. The composition according to claim 1, wherein the cyanoacrylate monomer is ethyl-2-cyanoacrylate.

5. The composition according to claim 1, wherein the metallocene component includes materials within the following structure:

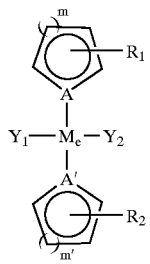

wherein $R_1$ and $R_2$ optionally occur at least once on each ring, are the same or different and are members selected from the group consisting of H; any straight- or branched-chain alkyl constituent having from 1 to about 8 carbon atoms; acetyl; vinyl; allyl; hydroxyl; carboxyl; —(CH₂)ₙ—OH, wherein n is an integer in the range of 1 to about 8; —(CH₂)ₙ—COOR₃, wherein n is an integer in the range of 1 to about 8 and $R_3$ is a member selected from the group consisting of H; Li; Na; any straight- or branched-chain alkyl constituent having from 1 to about 8 carbon atoms; —(CH₂)ₙ', wherein n' is an integer in the range of 2 to about 8; —(CH₂)ₙ—OR₄, wherein n is an integer in the range of 1 to about 8 and $R_4$ is any straight- or branched-chain alkyl constituent having from 1 to about 8 carbon atoms; and —(CH₂)ₙ—N⁻(CH₂)₃X⁻, wherein n is an integer in the range of 1 to about 8 and X is a member selected from the group consisting of Cl⁻, Br⁻, I⁻, ClO₄⁻ and BF₄⁻;

$Y_1$ and $Y_2$ are optionally present, and when present at least once are the same or different and are members selected from the group consisting of H, Cl⁻, Br⁻I⁻, cyano, methoxy, acetyl, hydroxy, nitro, trialkylamines, triaryamines, trialkylphospines, triphenylamine, and tosyl;

A and A' are the same or different and are members selected from the group consisting of C and N;

m and m' are the same or different and are 1 or 2; and $M_e$ is a member selected from the group consisting of Fe, Ti, Ru, Co, Ni, Cr, Cu, Mn, Pd, Ag, Rh, Pt, Zr, Hf, Nb, V and Mo.

6. The composition according to claim 1, wherein the metallocene component includes materials within the following structure:

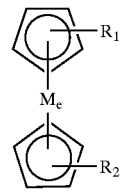

wherein $R_1$ and $R_2$ are the same or different, and each is a member selected from the group consisting of H; any straight- or branched-chain alkyl constituent having from 1 to about 8 carbon atoms, acetyl; vinyl; allyl; hydroxyl; carboxyl; —(CH₂)ₙ—OH, wherein n is an integer in the range of 1 to about 8; —(CH₂)ₙ—COOR₃, wherein n is an integer in the range of 1 to about 8 and $R_3$ is a member selected from the group consisting of any straight- or branched-chain alkyl constituent having from 1 to about 8 carbon atoms, H, Li, Na, and —(CH₂)ₙ', wherein n' is an integer in the range of 2 to about 8; —(CH₂)ₙ—OR₄, wherein n is an integer in the range of 1 to about 8 and $R_4$ is any straight- or branched-chain alkyl constituent having from 1 to about 8 carbon atoms; and —(CH₂)ₙ—N³⁰ (CH₃)₃ X⁻, wherein n is an integer in the range of 1 ito about 8 and X is a member selected from the group consisting of Cl⁻, Br⁻, I⁻, ClO₄⁻ and BF₄⁻; and $M_e$ is selected from the group consisting of Fe, Ti, Ru, Co, Ni, Cr, Zr, Hf, Nb, V and Mo.

7. The composition according to claim 6, wherein $M_e$ is selected from the group consisting of Ti, Cr, Cu, Mn, Ag, Zr, Hf and Mo.

8. The composition according to claim 1, wherein the metallocene component includes materials within the following structure:

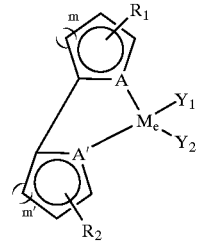

wherein $R_1$ and $R_2$ optionally occur at least once on each ring, are the same or different and are members selected from the group consisting of H; any straight- or branched-chain alkyl constituent having from 1 to about 8 carbon atoms; acetyl; vinyl; allyl; hydroxyl; carboxyl; —(CH₂)ₙ—OH, wherein n is an integer in the range of 1 to about 8; —(CH₂)ₙ—COOR₃, wherein n is an integer in the range of 1 to about 8 and $R_3$ is a member selected from the group consisting of H; Li; Na; any straight- or branched-chain alkyl constituent having from 1 to about 8 carbon atoms; —(CH₂)ₙ', wherein n' is an integer in the range of 2 to about 8; —(CH₂)ₙ—OR₄, wherein n is an integer in the range of 1 to about 8 and $R_4$ is any straight- or branched-chain alkyl constituent having from 1 to about 8 carbon atoms; and —(CH₂)ₙ—N'(CH₃)₃ X⁻, wherein n is an integer in the range of 1 to about 8 and X is a member selected from the group consisting of Cl⁻, Br⁻, I⁻, ClO₁⁻ and BF₄⁻;

$Y_1$ and $Y_2$ are optionally present, and when present at least once are the same or different and are members selected from the group consisting of H, Cl⁻, Br⁻¹, I⁻, cyano, methoxy, acetyl, hydroxy, nitro, trialkylamines, triaryamines trialkylphospines, triphenylamine, and tosyl;

A and A' are the same or different and are selected from the group consisting of C and N;

m and m' are the same or different and are 1 or 2; and $M_e$ is a member selected from the group consisting of Fe, Ti, Ru, Co, Ni, Cr, Cu, Mn, Pd, Ag, Rh, Pt, Zr, Hf, Nb, V and Mo.

9. The composition according to claim 8, wherein $R_1$ and $R_2$, are each H; $Y_1$ and $Y_2$ are each Cl; A and A' are each N; m and m' are each 2; and Me is Ru.

10. The composition according to claim 1, wherein the metallocene is selected from the group consisting of ferrocenes, titanocenes, and derivatives and combinations thereof.

11. The composition according to claim 1, wherein the metallocene is ferrocene.

12. The composition according to claim 1, wherein the hydrogen abstraction photoinitiator is selected from the group consisting of benzophenone, benzil, xanthone, pentadione, thioxanthrenequinone, 2,3-butanedione, phenanthrenequinone, ethylanthraquinone, 1,4-chrysenequinone, anthraquinone, camphorquinone, pyrene, benzanthrone and combinations thereof.

13. The composition according to claim 1, wherein the hydrogen donor is selected from the group consisting of ethers, alcohols, allylic compounds and combinations thereof.

14. The composition according to claim 1, wherein the hydrogen donor is selected from the group consisting of polyalkylene oxides, polyalkylene glycol (meth)acrylates, polyalkylene glycol di(meth)acrylates, cyclic ethers, crown ethers, calixarenes and oxacalixarenes, silacrowns, cyclodextrins, ethoxylated hydric compounds, and combinations thereof.

15. The composition according to claim 1, wherein the metallocene component is present in an amount within the range of 0.005% to about 4% by weight.

16. The composition according to claim 1, wherein the hydrogen abstraction photoinitiator is present in an amount within the range of 0.125% to about 5% by weight.

17. The composition according to claim 1, wherein the hydrogen donor is present in an amount within the range of 0–1.25% to about 10% by weight.

18. The composition according to claim 1, further comprising a member selected from the group consisting of viscosity-modifying agents, rubber toughening agents, thixotropy rendering agents, thermal-stabilizing agents, and combinations thereof.

19. The composition according to claim 1, wherein tho composition is useful as an adhesive, a sealant or a coating.

20. The composition according to claim 1, further comprising a cleavage photoinitiator.

21. The composition according to claim 1 in a one-part formulation.

22. The composition according to claim 1, having a viscosity within the range selected from the group consisting of about 1 to about 15 cps, about 100 to about 300 cps, and about 600 to about 1000 cps.

23. The composition according to claim 1, wherein the metallocene component is selected from the group consisting of diaryl phosphino metal-complexed ferrocenes, bis-alkyl ferrocenes, and $M_e[CW_3—CO—CH=C(O^-)—CW'_3]_2$, wherein $M_e$ is a member selected from the group consisting of Fe, Ti, Ru, Co, Ni, Cr, Cu, Mn, Pd, Ag, Rh, Pt, Zr, Hf, Nb, V and Mo, and W and W' are the same or different and are members selected from the group consisting of H and halogen.

24. A method of polymerizing a photocurable composition, said method comprising the steps of;

(a) providing an amount of the composition according to claim 1; and (b) subjecting the composition to electromagnetic radiation effective to cure the composition.

25. A photocurable composition comprising:

(a) a 2-cyanoacrylate component, (b) a metallocene component, (c) a hydrogen abstraction photoinitiator component, and (d) a hydrogen donor component, wherein the 2-cyanoabrylate component includes ethyl-2-cyanoacrylate, the metallocene component includes ferrocene, the hydrogen abstraction photoinitiator component includes phenanthrenequinone, and the hydrogen donor component includes polyethylene glycol diacrylate.

26. The composition according to claim 25, wherein the 2-cyanoacrylate component includes ethyl-2-cyanoacrylate in an amount within the range of about 97.9% by weight to about 99.4% by weight of the total composition, the metallocene component includes ferrocene in an amount of about 0.005% to about 0.05% by weight of the total composition, the hydrogen abstraction photoinitiator component includes phenanthrenequinone in an amount of about 0.1% to about 4% by weight of the total composition, and the hydrogen donor component includes polyethylene glycol diacrylate in an amount of about 0.1% to about 4% by weight of the total composition.

27. A method of manufacturing an article, comprising:

selecting portions of needles, syringes, lancets, hypodermics, injectors, bodily fluid collector sets, cannula/hub assemblies, cannula/tube assemblies, tube sets, intravenous sets, fluid delivery and withdrawal sets, suction tubes, anesthesia masks, face masks, surgical masks, angioplast catheters, balloon catheters, disc drives, magnetic sensors, battery holding cartridges, loud speakers, phase holograms, lenses or jewelry;

applying a photocurable composition according to claim 1, to said portions; and polymerizing by way of exposure to radiation in the electromagnetic spectrum said composition to thereby assemble said portions.

28. A method of repairing an article, comprising:

selecting a broken article selected from the group consisting of needles, syringes, lancets, hypodermics, injectors, bodily fluid collector sets, cannula/hub assemblies, cannula/tube assemblies, tube sets, intravenous sets, fluid delivery and withdrawal sets, suction tubes, anesthesia masks, face masks, surgical masks, angioplast catheters, balloon catheters, disc drives, magnetic sensors, battery holding cartridges, loud speakers, phase holograms, lenses and jewelry;

applying a photocurable composition according to claim 1, to said broken article; and polymerizing by way of exposure to radiation in the electromagnetic spectrum said composition to thereby repair said broken article.

29. A shelf stable photocurable composition comprising;

(a) a 2-cyanoacrylate component, (b) a metallocene component, and (c) a photoinitiator component comprising the combination of a hydrogen abstraction photoinitiator selected from the group consisting of benzophenone, benzil, xanthone, pentadione, thioxanthrenequinone, 2,3-butanedione, phenanthrenequinone, ethylanthraquinone, 1,4-chrysenequinone, anthraquinone, camphorquinone, pyrene, benzanthrone and combinations thereof, and a hydrogen donor selected from the group consisting of polyalkylene oxides, polyalkylene glycol (meth)

acrylates, polyalkylene glycol di(meth)acrylates, cyclic ethers, crown ethers, calixarenes and oxacalixarenes, silacrowns, cyclodextrins, ethoxylated hydric compounds, and combinations thereof.

30. A shelf stable photocurable composition comprising:
(a) a 2-cyanoacrylate component,
(b) a metallocene component, and
(c) a photoinitiator component comprising the combination of hydrogen abstraction photoinitiator present in an amount within the range of 0.125% to about 5% by weight, and
a hydrogen donor present in an amount within the range or 0.125% to about 10% by weight.

31. A photocurable composition comprising:
(a) a 2-cyanoacrylate component,
(b) a metallocene component,
(c) a hydrogen abstraction photoinitiator component, and
(d) a hydrogen donor component, wherein the hydrogen donor component includes polyethylene glycol diacrylate.

32. The composition according to claim 31, wherein the hydrogen abstraction photoinitiator includes phenanthrenequinone.

33. A shelf stable photocurable composition comprising:
(a) a 2-cyanoacrylate component,
(b) a metallocene component, and
(c) a photoinitiator component comprising the combination of a hydrogen abstraction photoinitiator and
a hydrogen donor,
wherein the hydrogen abstraction photoinitiator includes phenanthrenequinone.

* * * * *